(12) United States Patent
Roe et al.

(10) Patent No.: US 10,042,511 B2
(45) Date of Patent: Aug. 7, 2018

(54) GRAPHICAL USER CONTROL FOR MULTIDIMENSIONAL DATASETS

(71) Applicants: Marvin W Roe, Slidell, LA (US); Geary J Layne, Boulder, CO (US)

(72) Inventors: Marvin W Roe, Slidell, LA (US); Geary J Layne, Boulder, CO (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 877 days.

(21) Appl. No.: 14/323,715

(22) Filed: Jul. 3, 2014

(65) Prior Publication Data
US 2014/0325456 A1    Oct. 30, 2014

Related U.S. Application Data

(62) Division of application No. 12/356,656, filed on Jan. 21, 2009, now Pat. No. 8,793,619.

(60) Provisional application No. 61/033,085, filed on Mar. 3, 2008.

(51) Int. Cl.
| G06F 3/00 | (2006.01) |
| G06F 3/0481 | (2013.01) |
| G06F 3/0484 | (2013.01) |
| G06F 17/30 | (2006.01) |

(52) U.S. Cl.
CPC ...... *G06F 3/04815* (2013.01); *G06F 3/04847* (2013.01); *G06F 17/30592* (2013.01)

(58) Field of Classification Search
CPC .......................... G06F 3/04815; G06F 3/04847
See application file for complete search history.

(56) References Cited

U.S. PATENT DOCUMENTS

| 5,570,106 A * | 10/1996 | Viswanathan ......... G01V 1/301 367/72 |
| 5,592,195 A | 1/1997 | Misono et al. |
| 6,218,965 B1 | 4/2001 | Gendron et al. |
| 6,380,958 B1 | 4/2002 | Guendel et al. |
| 6,486,896 B1 | 11/2002 | Ubillos |

(Continued)

OTHER PUBLICATIONS

Bourgeois, B., et al, Undersea Mission Planning: Visualization Support for Deconfiction of 4DxN Constraints, 15th International Symposium on Unmanned Untethered Submersible Technology 07, Durham, New Hampshire, Aug. 2007.

*Primary Examiner* — Kieu Vu
*Assistant Examiner* — Andrew Chung
(74) *Attorney, Agent, or Firm* — US Naval Research Laboratory; Scott G. Bell

(57) ABSTRACT

A user control is provided for use with a multidimensional dataset that allows a user to graphically set the bounds for one or more of the dimensions of data selected from the dataset. The graphical user control includes a wireframe cube representing the extent of data in the dataset and a selector box within the data cube. A user can indicate a selected perspective and orientation of the data by selecting a portion of an edge of the selector box, and a visual indication of the selected perspective and orientation is provided. The user further can select a desired portion of the data by changing a size and/or a position of the selector box within the data cube. The graphical user control further includes a visual indicator representing the fourth dimension of the dataset and one or more navigation buttons.

20 Claims, 7 Drawing Sheets

Graphical User Control for 4-D Datasets – Control Mode

(56) References Cited

U.S. PATENT DOCUMENTS

| | | | |
|---|---|---|---|
| 6,765,570 B1* | 7/2004 | Cheung | G06T 17/05 |
| | | | 345/420 |
| 6,891,963 B1 | 5/2005 | Goto et al. | |
| 6,938,218 B1 | 8/2005 | Rosen | |
| 7,127,091 B2 | 10/2006 | Op De Beek et al. | |
| 7,180,516 B2 | 2/2007 | Kapler et al. | |
| 7,216,305 B1 | 5/2007 | Jaeger | |
| 8,303,505 B2 | 11/2012 | Webler et al. | |
| 2003/0052875 A1 | 3/2003 | Salomie | |
| 2003/0214537 A1* | 11/2003 | Lynn | G01V 1/34 |
| | | | 715/835 |
| 2004/0210850 A1 | 10/2004 | Benudez et al. | |
| 2004/0249303 A1* | 12/2004 | Serra | G06F 3/0481 |
| | | | 600/545 |
| 2004/0263509 A1 | 12/2004 | Serra et al. | |
| 2006/0044307 A1 | 3/2006 | Song | |
| 2006/0119601 A1 | 6/2006 | Finlayson et al. | |
| 2006/0238538 A1 | 10/2006 | Kapler et al. | |
| 2007/0008060 A1* | 1/2007 | Weller | G01N 27/023 |
| | | | 336/229 |
| 2007/0223306 A1* | 9/2007 | Toennessen | G01V 1/3808 |
| | | | 367/15 |
| 2008/0115082 A1* | 5/2008 | Simmons | G06N 5/02 |
| | | | 715/804 |
| 2008/0238916 A1 | 10/2008 | Ghosh et al. | |
| 2009/0083396 A1* | 3/2009 | Roos | G06F 15/16 |
| | | | 709/219 |
| 2010/0011309 A1 | 1/2010 | Mitra et al. | |

\* cited by examiner

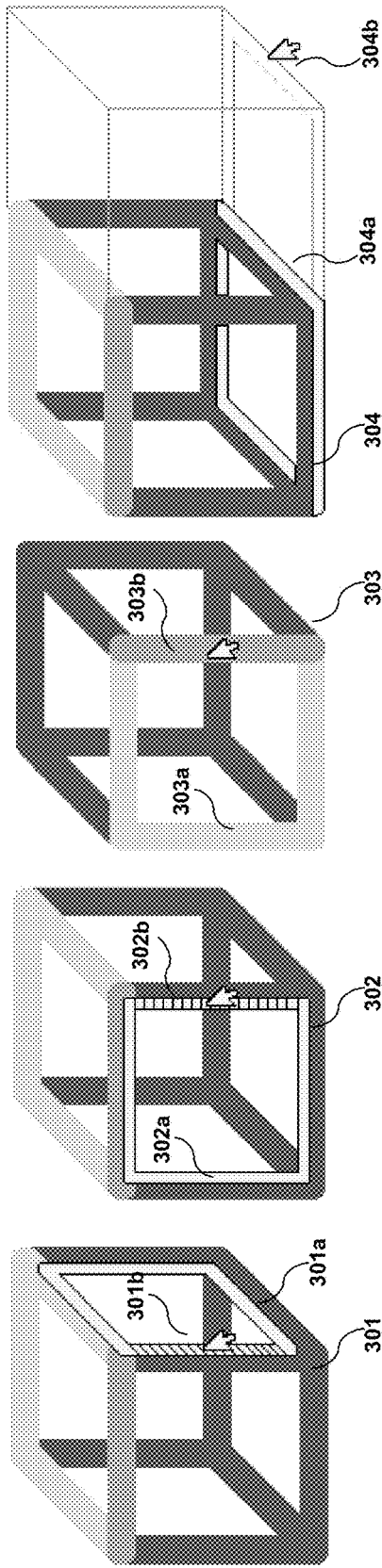

Graphical User Control for 4-D Datasets – Alternative Configurations

Separate 4th D Slider

US 10,042,511 B2

GRAPHICAL USER CONTROL FOR MULTIDIMENSIONAL DATASETS

CROSS-REFERENCE

This application is a divisional application of U.S. patent application Ser. No. 12/356,656 filed on Jan. 21, 2009, which claims the benefit of priority based on U.S. Provisional Patent Application No. 61/033,085 filed on Mar. 3, 2008, the entirety of both applications is hereby incorporated by reference into the present application.

TECHNICAL FIELD

The present invention relates to a graphical user control to facilitate navigation through datasets having multiple dimensions.

BACKGROUND

Interaction with one or more datasets is the basis for many applications, both in the military and the civilian realm. Many of these datasets are multidimensional, having data that represent values in more than one dimension.

For example, a dataset of ocean water characteristics can include three-dimensional data of latitude, longitude, and water depth, where every data point represents a specific location in the ocean as defined by particular latitude, longitude, and depth. Other data regarding the ocean's chemical and physical properties such as salinity, temperature, current speed, and direction also can be part of the dataset. In addition, such a dataset can also have an additional dimension such as time, wherein a particular point in the dataset represents a value for a specific location in the ocean at a particular time.

Working with data in a multidimensional dataset is a key part of the planning, development, and execution of operations, both civilian and military, relating to that data. For example, with respect to an ocean water dataset mentioned above, success of an operation can require careful analysis of many chemical and physical conditions of the water that can affect the operation's outcome. One important chemical property is salinity of the water at a particular point, which can be used with temperature and pressure (depth) to calculate water density, which in turn can determine the buoyant force range that an underwater vessel should be calibrated to in order to operate within the environment without sinking or becoming unrecoverable. Important physical characteristics can include water current speed and direction, which must also be known to be within an acceptable range for the operational limitations of the vehicle in question. Current speed and direction can also be used to calculate estimates of energy consumption and estimated time of arrival for points along a proposed operation route.

It is easy to see that this information is important to civilian operations such as commercial shipping and navigation, offshore oil and gas exploration, coastal management, and commercial fishing. Moreover, this information is also crucial to military missions such as operation of conventional Navy vessels and navigation equipment, missions relating to underwater gliders and unmanned underwater vehicles, and manned missions such as those conducted by Navy SEALs.

When planning for missions that consider these and other characteristics, it is beneficial to analyze all of the applicable datasets for the same volume at the same time, for example, to determine whether they have independent or combined effects on the outcome. One way of analyzing datasets is to graphically render the data, for example, into tables, charts or other visual displays. However, graphically rendering multiple-dimension datasets and allowing the user to navigate freely through them is extremely computer-intensive and complex to implement. See D. Hearn and M. P. Baker, "Computer Graphics C version," Second Edition, 1997. The advantages of this type of user interaction with the data in terms of added user decision-making ability in light of the required computing resources often are questionable at best. In addition, in some environments there may not be a horizon or other physical object to use as a frame of reference for proper orientation. This problem is particularly acute in underwater environments, where users can become disoriented and lose directional context regarding what they are viewing.

In addition, such datasets often are extremely large and therefore difficult and computer resource intensive to navigate due to the sheer size of the data involved.

To address some of these problems, one alternative to rendering graphics for multiple data sets is creation of a single union of the combined effects of all the data by applying thresholds to values within and in between each dataset to evaluate the overall conditions for the environment. One such approach is often referred to as "traffic light analysis" (TLA) since the results are usually limited to values that correspond to green (go), yellow (wait), or red (no go). See B. Bourgeois et al., "Undersea Mission Planning Visualization Support for Deconfliction of 4D×N Constraints," 15$^{th}$ *International Symposium on Unmanned Untethered Submersible Technology* 07, Durham, N.H., August 2007. Further processing of these results into Geospatial Bitmaps provides the added benefits of vector-to-raster conversion routines and high performance data comparisons between datasets. See U.S. Pat. No. 6,218,965, Moving Map Composer (2001). However, as noted above, graphically rendering multiple-dimension datasets is extremely computer-intensive and complex to implement, and thus may not be feasible in many cases.

Thus, it is desirable to provide a user control to enable a user to better work with multidimensional datasets. In particular, it often is desirable to provide a user a means to select a subset of the data so that relevant data may be analyzed to provide more useful results with less load on computer resources.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a user control for use with a multidimensional dataset that allows a user to graphically set the bounds for one or more of the dimensions of data selected from the dataset. The user control can be used with any application that works with the data set, and is particularly useful for applications that provide a visualization of the data by providing the user with a simplified method for choosing the desired perspective and orientation for what is to be visually displayed by the application.

The graphical user control of the present invention includes a wireframe cube representing three dimensions of the dataset, a selector box within the data cube that allows a user to indicate a selection of the data by a size and position of the selector box within the data cube, and a visual indicator of a perspective of the data being selected. The graphical user control further includes a visual indicator representing a fourth dimension of the dataset. The visual indicator allows the user to identify and select a further subset of the three-dimensional data defined by the selector box, based on the fourth dimension of the data. Each of the three-dimensional selector box and the fourth-dimension indicator can also be used separately to identify and select a desired subset of the data corresponding to the selector box or the fourth-dimension indicator, respectively. The graphical user control further includes one or more navigation buttons that allow the user to identify and select the desired perspective of the data being selected.

BRIEF DESCRIPTION OF THE DRAWINGS

FIGS. 3A-3D are block diagrams showing exemplary mouse interactions with a graphical user control in accordance with the present invention.

DETAILED DESCRIPTION

Figure 1A:
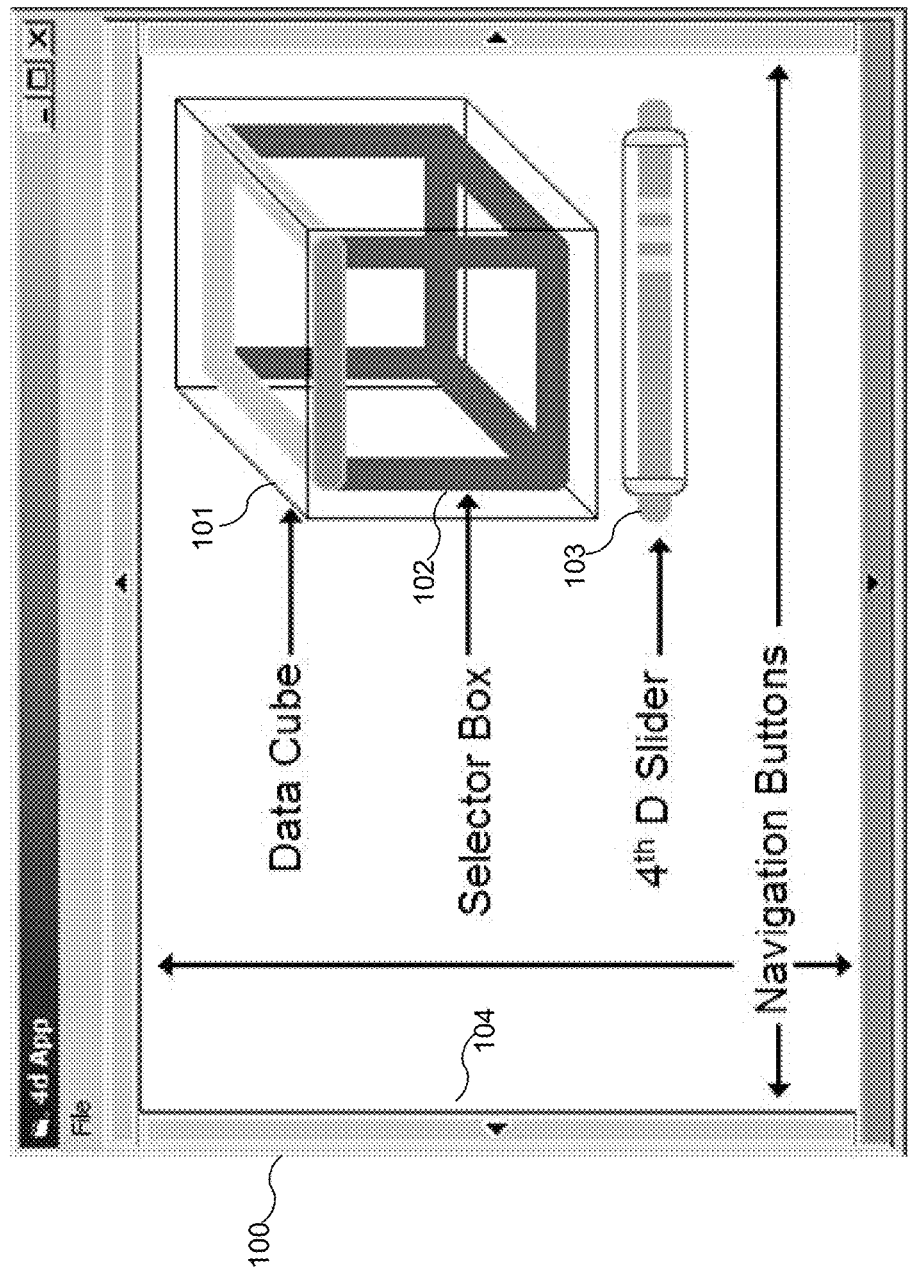
FIGS. 1A and 1B are block diagrams showing an exemplary configuration of components of a graphical user control for a four-dimensional dataset in accordance with the present invention.

The invention summarized above can be embodied in various forms. The following description shows, by way of illustration, combinations and configurations in which the aspects can be practiced. It is understood that the described aspects and/or embodiments of the invention are merely examples. It is also understood that one skilled in the art may utilize other aspects and/or embodiments or make structural and functional modifications without departing from the scope of the present disclosure.

For example, the graphical user control of the present invention is described herein as being in the form of a cube representing a three-dimensional dataset with a second cubic selector box within the data cube for selection of the desired data subset, and a bar representing the fourth dimension of the data with a slider for selection of the desired portion of that data. However, it should be appreciated that the geometry of the user control described herein is merely exemplary, and other geometries can be used within the scope and spirit of the invention. Also, although in the exemplary embodiment of the graphical user control of the present invention described herein and shown in the Figures, the visual indicia comprise colors, it can easily be appreciated by one skilled in the art that any form of visual indicia, such as a specific pattern or otherwise, also be used, and all such configurations are within the scope of the present disclosure.

In addition, although the graphical user control according to the invention is described herein in the context of its use in connection with a four-dimensional (4D) dataset, where three dimensions represent latitude, longitude, and depth and a fourth dimension represents time, it will be appreciated by one skilled in the art that the graphical user control according to the present invention can be expanded for use with datasets having more than four dimensions, for example by having multiple data cubes where multiple selections from the dataset can be made. For example, although the graphical user control is sometimes described herein as being used with a 4D ocean water dataset comprising salinity data at particular points in the ocean at particular times, it is easily apparent that the principles of a user control having one or more features described herein can be used for any multi-dimensional dataset.

Further, although the user control of the present invention is described as being used in an application used to identify and graphically display mission conditions for underwater vessels, it can be appreciated that a user control in accordance with the present invention can be used with any application wherein analysis of all or a portion of a multi-dimensional dataset is desirable. For underwater vessel environment analysis, one type of dataset to be studied through the use of this invention is the results of traffic light analysis. Traffic light analysis is the practice of identifying thresholds given specific datasets such as current speed within an oceanographic forecast. The analysis results would, for example, identify all places within the dataset where the current speed is between 0 and 2 knots. The resulting dataset would display red where the conditions are met, green otherwise, and potentially yellow if a third cautionary rule was defined. The results will potentially be similar to the movement of a lava lamp.

In cases where the analysis is done somewhere between the surface and the ocean floor, no other visual reference may be available to indicate the orientation of the graphics being displayed. The invention provides the necessary support to allow studying the results in order to find paths in and around these areas by helping the user maintain proper perspective. Since the ocean environment is dynamic and constantly changing, this invention is crucial for effective dataset navigation and study. As will be described in more detail below, a graphical control for multidimensional datasets in accordance with the present invention includes a collection of components that can operate together and can be configured in different ways. It should be noted that the configuration shown in the Figures and described herein are used to illustrate basic functionality of the graphical control of the present invention and do not necessarily reflect any required visual styling or relative size ratios of the components of the invention. It is also contemplated that many aspects of a graphical control for multidimensional datasets according to the present invention can be configurable to meet the different needs of different datasets, users, and applications, and that such configurations are within the scope and spirit of the present disclosure.

The components of the graphical control shown in the figures can be connected to the code for the associated application through a single interface. Event processing and property setting can be done through this single interface to simplify the integration between the control and the application. As will be described below, the same event can be generated through interactions with one or more components, and therefore, the single interface should be capable of handling synchronization of the constituent parts. Synchronization of constituent parts also may be required if a change to one component requires other components to update their state or if a property setting affects more than one component. Thus, an application implementing a graphical user control in accordance with the present invention will ordinarily instantiate each of the component parts to be used, add them to the application's layout scheme, and register them with the control-application interface controller. In this way, the application can ensure that the components to the graphical user control are properly coordinated and that it will interact with the application's dataset in the desired way while allowing flexibility in how the components are integrated into the application GUI.

An exemplary configuration of a graphical user control for 4D datasets in accordance with the present invention will be described in the context of the Figures. It is important to note that the Figures are intended to illustrate basic component functionality and interaction and do not reflect any required visual styling. In addition, it is contemplated that a goal of some application developers may be for the control to be unobtrusive as possible, and thus in one or more embodiments, a graphical rendering of the control according to the invention can have one or more transparent or semi-transparent components, and the components can be made as small and/or thin as possible without causing them to lose their effectiveness. Regardless of the configuration, the control can provide a connection between what the user wants and what the application needs to know in order to analyze the data, for example, by presenting the results as a 2D or 3D rendering in a graphics window.

Components of an exemplary configuration of a graphical user control for 4D datasets in accordance with the present invention are shown in FIG. 1A. As seen in FIG. 1A, an exemplary configuration can include a data cube 101, a selector box 102, a $4^{th}$D slider bar, and one or more navigation buttons 104. These components work together to provide the user key functionality to the user. The components provide users the ability to choose how they want to observe data in a 4D environment and help them maintain an understanding of their frame of reference and orientation at a glance. Each of these components will be described in more detail below.

The first component is Data Cube 101 shown in FIG. 1A. In the exemplary configuration shown, Data Cube 101 comprises a thin wire frame that represents the full range of data available to navigate in the x, y and z dimensions. The visual size of this component can be set by the application or configured by the user. In addition, the wire frame comprising Data Cube 101 can visually reflect the relative sizes of the three dimensions once each of their data ranges has been initialized. As described in more detail below, Data Cube 101 also can communicate the context and orientation of the data being analyzed by the user.

The second component shown in FIG. 1A is Selector Box 102. Selector Box 102 comprises an interactive wire frame that allows a user to identify and select the portion of data from the dataset to be analyzed. Data Cube 101 provides a boundary frame of reference for sizing and positioning Selector Box 102. For example, Selector Box 102 can be used to set the size of the volume of data to be rendered in the graphics window. In addition, the position of Selector Box 102 within Data Cube 101 can be set to determine exactly which volume of data will be rendered. Additional functionalities of Selector Box 102 allow the user to choose the perspective and rotation of the data to be rendered in the graphics window. In addition, in some embodiments, more than one Selector Box may be situated within the same Data Cube, and each Selector Box may be used to identify and/or select data from the dataset. These and other aspects of Selector Box 102 will be described in further detail below.

The next component of an exemplary configuration of the graphical user control according to the invention shown in FIG. 1A is $4^{th}$ D Slider 103. $4^{th}$ D Slider 103 is dedicated to control of data comprising the $4^{th}$ dimension of the dataset. As will be described in more detail below, $4^{th}$ D Slider 103 provides the user with basic position selection capability plus two important additional capabilities. The first of these is the ability to stretch the sliding marker to cover a section, or period if considering time, of the representative data. The second is the ability for the application to dynamically set a color pallet of multiple, layered data values. When used to evaluate time-based data, $4^{th}$ D Slider 103 combines and extends the ideas of progress bars, data sliders, and data layers by allowing indication of more than one condition and by allowing an adjustment for the amount, or window, of composite data to be viewed.

The fourth component of the exemplary embodiment of a graphical user control for 4D datasets shown in FIG. 1A comprises one or more Navigation Buttons 104 that can be linked together programmatically and symbolically to Selector Box 102. Navigation Buttons 104 provide convenient access to traversing adjacent sides or perspectives from the currently chosen view. The appearance of the Navigation Buttons 104 corresponds to the visual indicia of the selected perspective and orientation, where the "highlighted" Navigation Button corresponds to the highlighted edge of the Selector Box. In addition, Navigation Buttons 104 allow the user to "rotate" the view around the Selector Box relative to the chosen frame of reference by selecting one of Navigation Buttons 104, with the direction of rotation being indicated by the arrow on the selected Navigation Button. Thus, in the exemplary configuration shown in FIG. 1A, Navigation Buttons 104 are aligned as borders to the view and are color coordinated to align with the orientation of the current view. The colors of the top, bottom, left and right buttons correspond to the frame edges highlighted on the Selector Box with the bottom button color being different to signify the bottom edge of the graphics perspective. Of course, alternative configurations are possible, both in terms of placement of the Navigation Buttons and the visual indicia of the orientation of the current view, and it is contemplated that such alternative configurations can either be selected by the application developer or by the user within the scope of the present invention.

As noted above, a graphical user control for 4D datasets in accordance with the invention includes two operational modes: a control mode and an indicator mode. A depiction of an exemplary embodiment of the control mode is shown in FIG. 1A. The control mode is enabled when the user moves the mouse over a specified area of a window of the application being used to analyze and visualize the dataset, for example, the top right area of a graphics window of the application. As seen in FIG. 1A, the control mode provides a magnified view of the control with the most information about the currently selected perspective. It also allows the user to interact with 3D Selector Box 102 and $4^{th}$ D Slider 103 described briefly above and in more detail below.

Figure 1B:
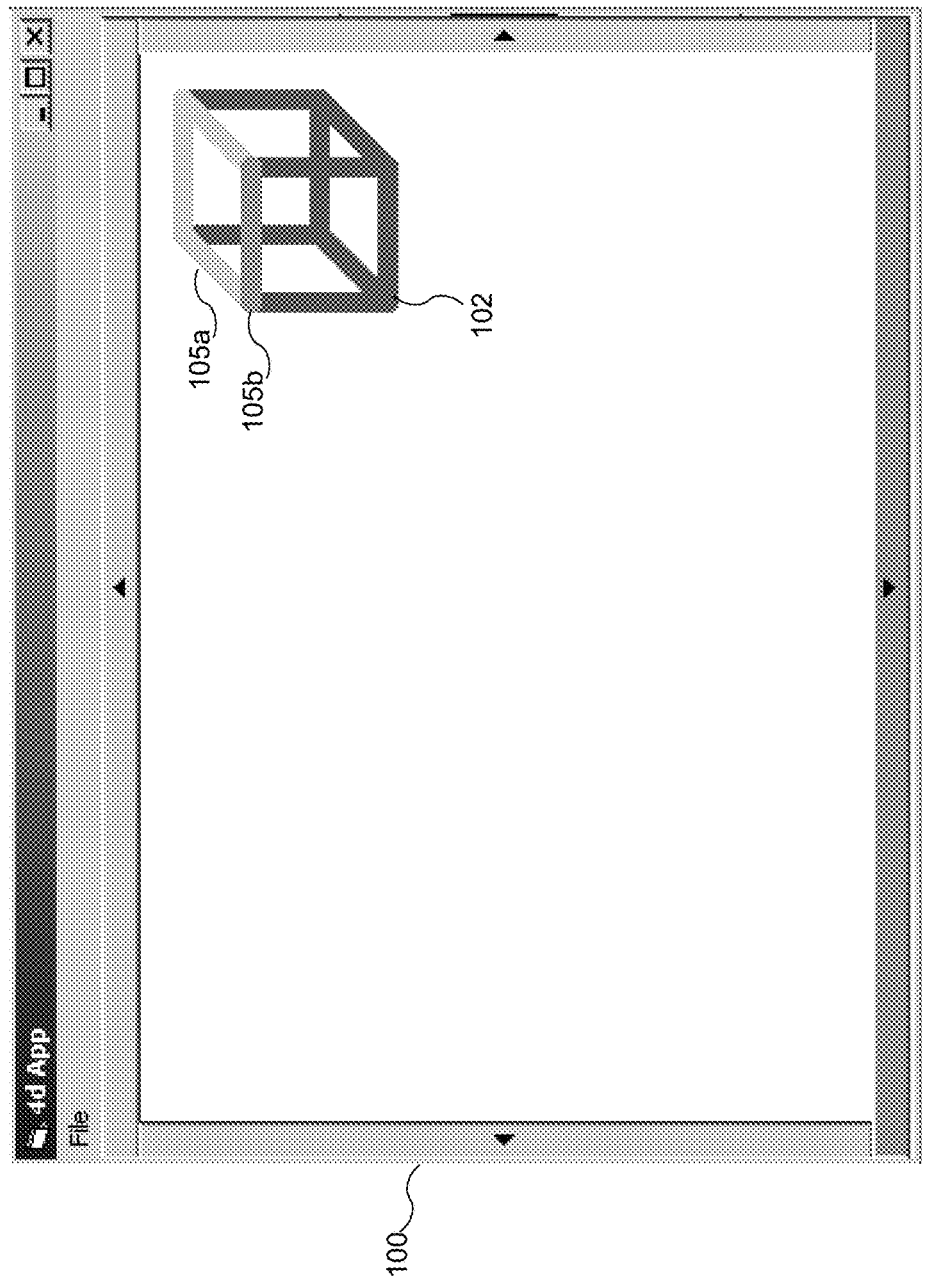

A second operational mode of the graphical user control of the present invention comprises an indicator mode shown in FIG. 1B. The indicator mode is enabled, or more correctly, the control mode is disabled, when the user's mouse is moved away from the specified area of the graphics window. In the exemplary embodiment of the indicator mode shown in FIG. 1B, a simplified graphical rendering of 3D Selector Box 102, having 202 highlighted top side 105a and orientation bar 105*b*, is displayed to provide the user's perspective at a glance. Data Cube 101 and $4^{th}$ D Slider 103 are hidden and 3D Selector Box 102 is reduced in size and tucked up into the corner in indicator mode to provide maximum viewing of the data being rendered in the graphics window.

Figures 2A, 2B, 2C:
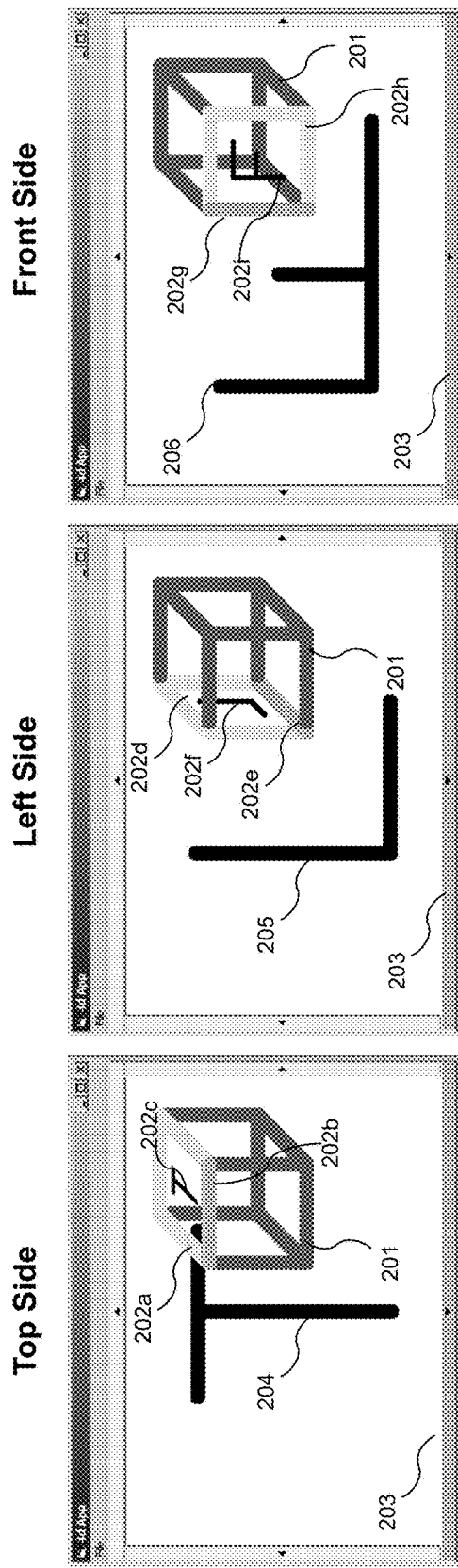
FIGS. 2A-2C are block diagrams showing exemplary perspective and orientation aspects of a graphical user control in accordance with the present invention.
Figure 4A:
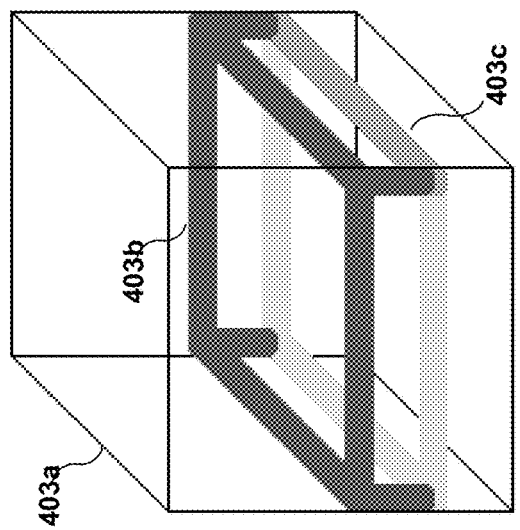
FIGS. 4A-4C are block diagrams showing exemplary selections of a subset of data using a graphical user control in accordance with the present invention.
Figure 4B:
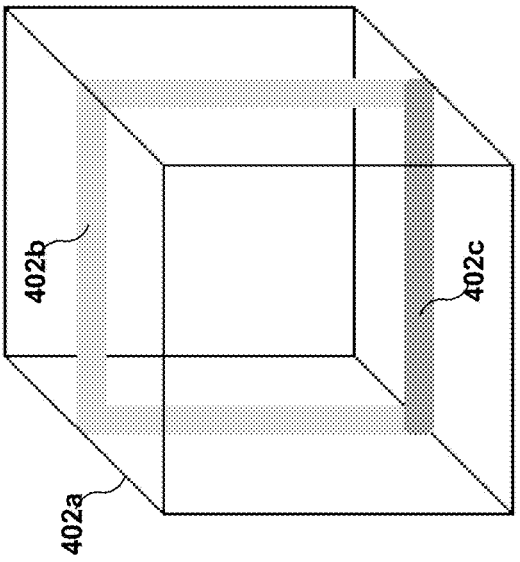

FIGS. 2A-2C depict aspects of operation of a 3D Selector Box in a graphical user control for 4D datasets in accordance with the present invention. One key function of the 3D Selector Box is helping the user understand the perspective and orientation of the data with which they are working. As previously seen in the exemplary configuration shown in FIG. 1A, a 3D Selector Box in the present invention comprises six sides, with each side having four possible rotations, for a total of twenty-four perspective views into the volume of data defined by the Selector Box. If the Selector Box is used to identify a single data slice as shown in FIGS. 4A and 4B, there will be eight views, one each for viewing from the front and the back of the single data slice, and four rotations for each such view. In addition, each side of the Selector Box can be identified as follows: T for the top, B for the bottom, L for the left, R for the right, F for the front and A for the aft. In some embodiments the sides can be so labeled, but an actual visual labeling of the sides is not required. To assist in the discussion herein, FIGS. 2A-2C use this labeling scheme to display some examples of how perspective and orientation are related between the Selector Box and the graphics rendering window.

FIG. 2A shows a Selector Box with its top side labeled and further shows an example of how the graphics window would orient its rendering of the selected data. As seen in FIG. 2A, a top side 202*a* of Selector Box 201 has been highlighted, for example by the user selecting the top side by clicking the mouse on one of the top side wire frame edges or by selecting a corresponding menu item linked to the control-application interface controller event mechanism. In addition, as seen in FIG. 2A, the edge of the wire frame 202*b* under the T is set to have the same visual indicia as the bottom Navigation Button 203 located under the application window. This visual indicia shows the correlation between the bottom edge of the graphics rendering and the edge of the box selected by the user, for example by clicking on the edge directly on the Selector Box.

One key visual indicia of the graphical user control of the present invention is an "orientation bar," which can be analogized to a "chin up bar" where the user imagines looking into the Selector Box from that side while placing their chin on the specified bar. The perspective of the data rendered in the graphics window will correspond to the perspective of the data "seen" by the viewer looking in on the data from that location. For example, in FIG. 2A, a user looking at the data represented by T 202*c* from orientation bar 202*b* would see the data as upright and non-reversed, as represented by T 204 in the graphics window.

FIG. 2B continues this example by showing how the application would orient the graphics when the left side 202*d* of Selector Box 201 is chosen and bottom Navigation Button 203 is the reference bar. As seen in FIG. 2B, in such an orientation, as with the data in FIG. 2A, the data from the "left side" of the dataset would be seen upright and non-reversed, as represented by L 205 in the graphics window. A user looking at the data represented by L 202*f* from orientation bar 202*e* would see the data as upright and non-reversed, as represented by L 205 in the graphics window.

FIG. 2C shows how the application would orient the graphics if the user were looking into the front of the Selector Box 201 with their gaze rotated 90 degrees clockwise. Thus, in the exemplary case shown in FIG. 2C, the front side 202*h* and orientation bar 202*g* are chosen to represent the rotated perspective of the data being rendered. FIG. 2C shows the described graphical rotation via the rendered 'F' 202*i* in the Selector Box 201 and 'F' 206 which is shown with a 90 degree rotation in the graphics display window. The combination of Selector Box 201's orientation bar 202*g* indicia and lower Navigation button 203 indicia can enable the user to easily understand the context of the rendered graphics relative to the selected perspective.

In addition, in some embodiments of the graphical control of the present invention, a "preview" of the perspective of the rendered graphics can be displayed in the graphics window. For example an appropriate graphic can appear on the selected side of the Selector Box 201 and a larger graphic representing the orientation of the data can appear in the graphics window when a particular orientation bar is selected. Thus, referring to FIG. 2A, T 202*c* can appear on the top of Selector Box 201 when the top 202*a* is selected, and T 204 can appear when orientation bar 202*b* is selected; and referring to FIG. 2C, F 202*i* can appear at the front of Selector Box 201 when front 202*h* is selected, and the counterclockwise F 206 can appear when orientation bar 202*g* is selected. If a different orientation bar were selected, the "F" graphic shown in the graphics window would have a corresponding rotation to indicate that orientation and perspective. Thus, in this way, the user can easily see the orientation and perspective of the graphic that will be rendered from the selected data, before actually having to create a graphic from the data, saving time and computing resources, and can correct the selected orientation as necessary to ensure that erroneous results do not occur.

As noted above, the present invention can provide a steady frame of reference correlation between the rendered graphic rendering and its orientation within the selected dataset. For many types of data, the orientation of the data is inherent within the data. Such examples are the existence of a "horizon," the presence of buildings, or other physical characteristics of the data that imply orientation up, down or otherwise. For mission planning in underwater environments, however, this orientation can easily be lost when looking at parameters such as current speed, temperature or density. These physical characteristics of the environment by themselves don't imply any orientation to a coordinate system and require additional information to ensure that they are viewed from a proper orientation. One example of this is provided by conditions sometimes experienced by swimmers while SCUBA diving. In the weightless (neutral buoyant) conditions underwater, a diver often has no visual means to determine the direction back to the surface. In such cases, he or she can watch the direction of the air bubbles they produce to gain a reference. Likewise, the visual indicia of the 4D graphical control can be used to determine 'which way the bubbles would be going' for a given graphics display.

As noted above, the graphical user control for 4D datasets according to the present invention can allow a user to select an orientation for the data selected by clicking on a portion of the Selector Box representing that data.

FIGS. 3A-3D depict the way in which the user can select or change the perspective or orientation of the data being analyzed. In the exemplary embodiment shown in the Figures, it can be seen that each edge of the Selector Box is part of two adjacent sides. If in its simplest form each edge of the wire frame is drawn with a line width of 2 pixels, each side of the line (1 pixel each) can represent the side of the box closest to it. In some embodiments, one or more of the developer of the application with which the graphical user control is to be used or the user can vary this as desired for scaling, aesthetics, and ease of operation.

The software controlling the graphical user control will treat any time the user has the mouse over the Selector Box as a potential change in the user's interaction with the dataset. Thus, the software can track the mouse position and where each edge of the Selector Box wire frame is drawn, and can highlight a side of the Selector Box of interest when the mouse is hovering over any part of the edge that relates to that side. This will occur when the mouse is over the graphic representing the Selector Box, since the open areas inside the Selector Box can potentially represent either of two sides. To assist the selection process, the software can visually indicate the particular edge of the Selector Box that the mouse is over in, for example, a pattern or a color different than the rest of the proposed side to indicate that it will become the new "chin-up bar" for purposes of perspective and orientation as discussed above.

FIGS. 3A-3D show various examples of a visual indicia that can be given when the user hovers the mouse over the Selector Box. Thus, as seen in FIG. 3A, when the user hovers the mouse over the right side 301a of the Selector Box 301, the right side of the Box is highlighted. In addition, a further visual cue can be given to indicate that the mouse is hovering over the left edge 301b of that side, shown as a horizontal pattern in the exemplary embodiment depicted in FIG. 3A. FIG. 3B shows the similar highlighting that could occur if the user then moves the mouse to hover over the front side 302a of the Selector Box 302. Note that the highlighted edge 302b is the other side of the edge depicted in FIG. 3A, and is highlighted in a similar manner to indicate that the mouse is hovering over it and that it may be selected as the "chin-up bar" for the dataset.

No selection is actually made until the user indicates such a selection, for example by clicking a left mouse button over the pixel on the desired side of the edge. Once the selected pixel is clicked, a signal is sent to the application to update its graphics window and the Selector Box updates its indication of the new perspective and orientation as shown in FIG. 3C. Thus, as shown in FIG. 3C, the front side 303a of Selector Box 303 is highlighted to indicate that it has been selected by the user, and further, the right edge 303b of the front side is highlighted in a different color to indicate that it has been selected as the orientation "chin-up bar" for the dataset. In addition, it is contemplated that the user can just as easily cancel a choice of perspective and orientation. Thus, if a user clicks the left mouse button over a pixel to select a side of the data set and an orientation bar but then decides that they don't want that choice, the selection can be cancelled, for example, by pressing and holding the right mouse button while releasing the left mouse button to cancel the choice. This feature aids performance since choosing a new perspective and orientation could take time depending on the amount of data and the nature of the graphical rendering. All of this functionality will also be available to application developers through the 4D control interface to allow the creation of custom interaction.

After the orientation of the Selector Box has been set, the user also can interact with the Selector Box to represent a desired selection of data from the dataset. In accordance with the present invention, such selection can be made by resizing and/or repositioning the Selector Box in a manner such as that described below. The design of the mechanism for resizing and positioning is a continuation of the approach taken to allow the selection of perspective and rotation. Thus, in a graphical user control having one or more features described herein, the user can indicate a desired direction to adjust, resize, and/or move the Selector Box by hovering the mouse over the edge of the side that when moved would stretch or shrink the box in the desired direction. For example, as shown in FIG. 3D, a user can resize Selector Box 304 by pressing down the left mouse button on edge 304a and drag the edge in the desired direction until it reaches the desired position. In the exemplary embodiment shown in FIG. 3D, as the Selector Box is being resized, it can be rendered as a simple line drawing 304b to allow precise adjustment of the size and position. When the left mouse button is released, the new size of the Selector Box is set and the rendering returns to normal. Alternatively, if the user wishes to move the Selector box instead of resizing it, the user can use a combination of keystrokes and mouse clicks, for example, by holding the shift key down while dragging the mouse. The user can also cancel each of these actions, for example, by pressing the right mouse button prior to letting up the left mouse button. In other embodiments, the dataset application can prompt the user for values that translate to the desired size and position and then can update the settings through the application's API.

Figure 4C:
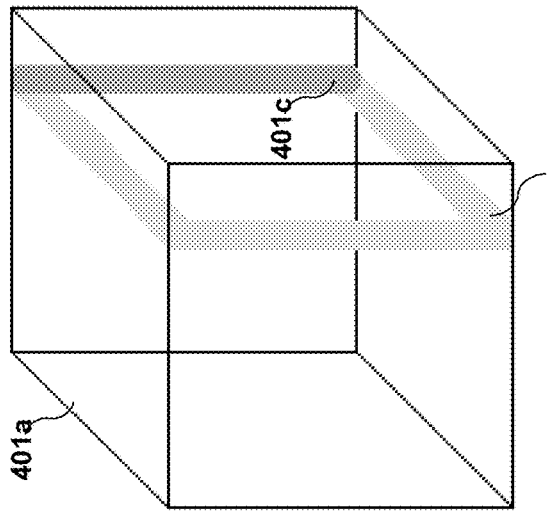

FIGS. 4A-4C present examples of how these functionalities can be used to assist in analyzing data. It can be easily seen that the ability to resize and move the Selector Box can be useful in many ways while analyzing the data. In accordance with aspects and features described herein, the Selector Box can be resized and/or moved to indicate a selection of a subset of the 4D dataset. The subset of the data in the dataset data identified by the Selector Box can then be analyzed by the application, for example, used to render graphics that can be displayed in a graphics box such as graphics box 100 shown in FIGS. 1A and 1B.

FIG. 4A shows the case where the Selector Box 401b has been resized to represent a single 2D plane that can be used to analyze a single two-dimensional slice through the volume of data in the dataset represented by wireframe 401a. One example of such a two-dimensional data slice, where one dimension is kept constant but the other two dimensions extend to all values in the dataset, would comprise values of ocean salinity at all latitudes and depths at a particular longitude. As seen in FIG. 4A, orientation bar 401c is on the aft side of the box, and thus in this case the data would be viewed from aft to front. Further analysis of the dataset can be performed by moving, or sliding, the single plane along the x axis to review the data one step at a time, e.g. at different longitudes. Alternatively, the Selector Box can be further resized along the y axis, the z axis, or both, to select an even smaller subset of data, e.g., values of ocean salinity at specified latitudes and/or depths at that longitude. FIG. 4B shows how this same functionality could be used to resize the Selector Box 402b to look at single data slices along the y axis of the wireframe 402a, e.g., to look at ocean salinity at all depths and longitudes for a particular latitude. Note that in FIG. 4B, the orientation bar 402c is at the bottom of the Selector Box frame 402b, and thus the graphics display will represent the user's gaze from the front with no rotation.

In addition, although FIGS. 4A and 4B show analyzing the data in a single slice, the Selector Box can be set to any size to permit the user to select any desired three-dimensional subset of the 4D dataset represented by the wireframe. Thus, as seen in FIG. 4C, Selector Box 403b can be resized so that it extends to the entire range of the x and y directions of wireframe 401a and has some depth of more than a single plane in the z direction to represent, for example, a selection of values of ocean salinity at all latitudes and longitudes for a range of depths represented by the depth of the Selector Box. The placement of orientation bar 403*c* represents the perspective of a user lying on his back under the Data Cube looking up into the box with their feet stretched out to the right of the page.

This approach to using the Selector Box could be used to step through the volume in a similar way as the single data plane examples, except along the y axis. One way to look at the difference here is that the display window would be showing a composite of how all of the currently selected single planes within the range of the Selector Box would appear overlaid in a drawing of either 2D or 3D perspective. Another example use for resizing and moving the Selector Box is for identifying the extent of some phenomenon in the volume data. The Selector Box could be resized to frame the data of interest and then the application could provide a way for the user to signal that this should be the new extent of the Data Cube, in effect zooming in to allow further exploration of the phenomenon.

Use of the Data Cube and the Selector Box is intended to be dynamic so that applications can use them in many contexts. Thus, in some embodiments, the user can set the size and position of the Selector Box and also influence the range that the Data Cube represents. In other embodiments, the application associated with the 4D dataset can drive the size and position of, the Data Cube, the Selector Box, or both. One example of such an embodiment would be where the application is using the Selector Box as a 3D buffer of some size centered on the current position of an underwater vessel as it is moving through a simulated or real-time monitoring exercise. In other embodiments, the user may be able to draw data points within the Data Cube, for example, to represent vessel positions or other data. In addition, other functionality also may be provided, including hot keys, hot points and other features to assist the user in achieving helpful actions such as centering the Selector Box within the Data Cube or maximizing the Selector Box within the Data Cube.

In many cases, a user may wish to further refine the subset of data identified using the Selector Box as described above. For example, the dataset regarding ocean salinity at particular latitudes, longitudes, and depths may also have a fourth dimension, e.g., a time component extending for a week, a month, or longer. The fourth dimension could also be a non-time related variable, such as ocean temperature or water pressure. The graphical user control according to the present invention will allow the user to further refine the selection of data along this $4^{th}$ dimension by use of an additional control such as the $4^{th}$ D Slider shown in FIGS. 5A-5D. Similar to the Selector Box, the $4^{th}$ D Slider provides several convenient ways to analyze data as described below.

Figure 5B:
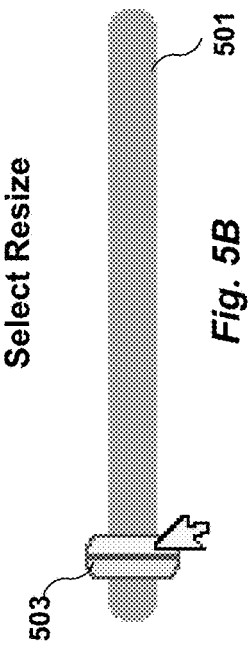
FIGS. 5A-5D are block diagrams showing exemplary aspects of a $4^{th}$ dimension slider selector device in a graphical user control in accordance with the present invention.
Figure 5D:
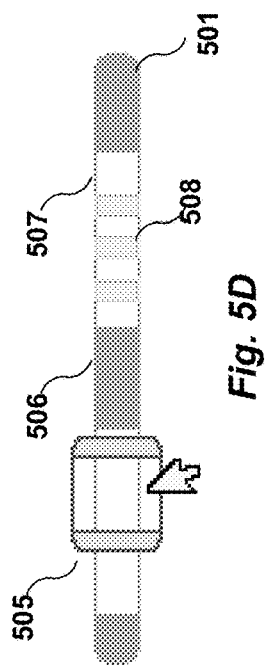
Figure 5A:
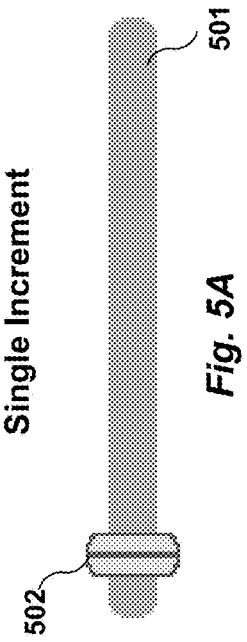

The most basic functionality provided by a $4^{th}$ D Slider according to aspects of the present invention described herein is shown in FIG. 5A, where slider 502 can be used to move along the range of data represented by data bar 501 while looking at one value at a time.

Figure 5C:
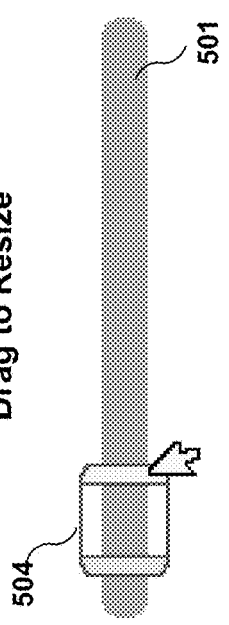

FIG. 5B illustrates ways in which the slider also can allow a range of values to be selected, which can be useful for evaluating a subset or the entire range of data represented by the slider. Setting or changing the range represented by the slider can be done in manner similar to that described above with respect to the Selector Box. Thus, FIG. 5B shows the mouse hovering over the right side of slider 503. The user can then use the mouse to stretch or resize slider 503, for example, by pressing down the left mouse button and dragging as shown in FIG. 5C to create slider 504. This same operation can be done to the left side of the slider. Of course, the slider can be resized from any point on the data bar 501, and FIG. 5D illustrates this, showing that slider 505 can be dragged to any of the positions 506 and resized from that point.

In addition, the $4^{th}$ D Slider can be used not only to indicate the size of the subset of the data and which subset of values is selected but also to provide an indication of where certain types of data are located within the dataset. To accomplish this, the $4^{th}$ D Slider can use a visual indicator to provide feedback to the user regarding an identification of the data corresponding to the position or size of the $4^{th}$ D Slider. In some embodiments, a draw order or layering of different visual indicators can be set to highlight various conditions at different positions along the length of the slider.

The type and use of such a visual indicator can be set in any number of ways, for example, either by software in the graphical user control itself or by the application being used to analyze the 4D data, and can be either an application-defined parameter or can be set by the user as a user preference. For example, in some embodiments, a color palette can be set and a value or range of values that a particular color corresponds to can be identified. In other embodiments, the visual indicator can be a variety of patterns. In addition, in some embodiments, the visual indicator can change to a second identifier to indicate a selection of the data corresponding to a first identifier. Any combination of these can also be used to provide a visual identification to the user of the data being identified and/or selected.

Use of such visual indicators along the $4^{th}$ D Slider can be used to help guide the user to what they want to see and to help them see patterns in the conditions represented by the data. Such a feature can be very useful in both military and civilian applications. For example, visual indicators along a $4^{th}$ D Slider representing a time series of datasets could indicate daytime and nighttime and include the times at which the three-dimensional data have the most dangerous conditions. FIG. 5D illustrates an example of such highlighting. The longer sections of light 507 and dark 506 could represent daytime and nighttime, respectively, and the three bars 508 over the light section on the right half of slider bar 501 could represent anything from tidal surges to times of high shipping traffic. In some embodiments, if the conditions are dangerous over the entire length of time represented by the slider and that condition is set as the top layer, the entire slider could have the visual indicator of that condition, e.g., be highlighted in one color. In other embodiments, the vertical heights of different visual indicators could be different so that they may be more clearly seen on a screen. These or any other visual indicators can be used as set by the application developer or by the user as noted above.

Figure 6B:
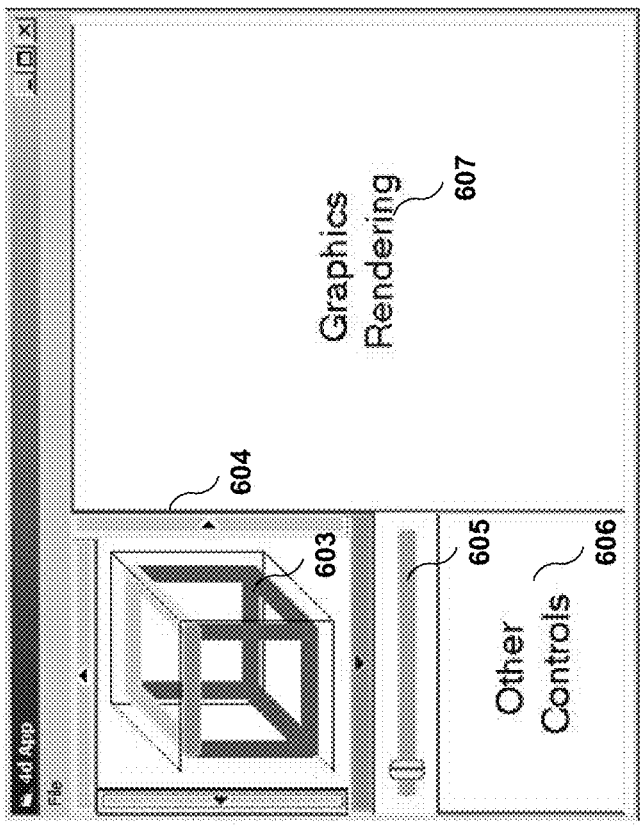
FIGS. 6A and 6B are block diagrams showing exemplary alternative configurations of a graphical user control in accordance with the present invention.
Figure 6A:
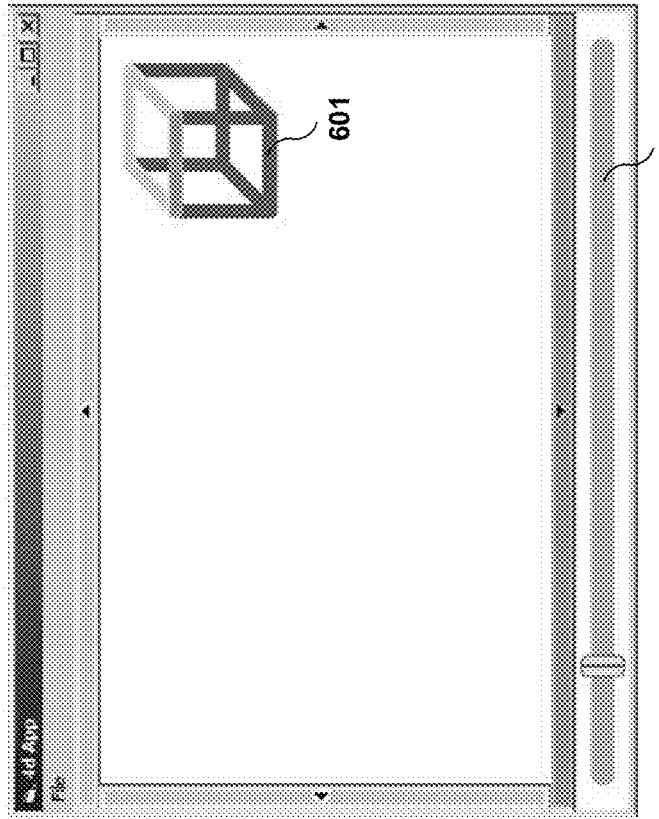

Additional uses of a graphical user control for 4D datasets according to the present invention can provide the ability to define a tiered configuration that integrates more than one 4D control. For example, use of more than one graphical control could be very useful in contexts such as mission planning, where the dataset can be very large when considering the entire geospatial and temporal scope of a mission and the number of environmental datasets needed for analysis and planning. In such a case, the application could implement two instances of the 4D graphical user control. In this example, the first instance would be used to define the entire scope of the mission and the second would define a smaller subset within the overall scope for navigation and display. Each graphical user control would act as a query mechanism to allow the user to define what data the application should load into memory, whether from a local or remote file or database. For example a user could set the size and position of the Selector Box of the first instance to choose the initial dataset and its perspective and orientation, and then signal the application to retrieve that set of data. The user could then use the second instance of the graphical user control to further refine the subset of data to be analyzed. FIGS. 6A and 6B illustrate alternative configurations for the graphical user control of the present invention. As with other configuration settings described above, such alternative configurations can be set by the application developer either as defaults for the 4D data application or as user-configurable settings in, for example, a user preference menu.

For example, in the configurations previously described, wherein the 4D control is in a corner of the window when not in use, presents a convenient way to access the functionality of the 4D control and leaves most of the window real estate available for drawing graphics. However, this configuration may be a disadvantage if the user has selected the volume of interest with the Selector Box and then wants to pan through the $4^{th}$ D using the slider. The user would have to enable the control mode by moving the mouse over the control which would hinder viewing the graphic display while operating the slider and having to look past the magnified set of components on top of the window. FIG. 6A shows a slightly modified configuration to address this situation, where Selector Box 601 is in its usual position in a corner of the window and $4^{th}$ D Slider 602 has been located under the bottom navigation button. This way the user can pan with a less obstructed view. In this configuration, the control mode can still operate in the same way as described above except for the location of the $4^{th}$ D Slider.

While this is a better configuration in some senses, there still could be an issue of having the control overlaying the graphics window. If the application provides mouse interaction with the graphics window there could be complications when determining whether mouse actions around the $4^{th}$ D Slider are intended for the graphical user control or for the graphics window itself. One possible solution for this is shown in FIG. 6B. In the alternative configuration shown in FIG. 6B, the graphical user control comprising Selector Box 603, Navigation Buttons 604, and $4^{th}$ D Slider 605 are located in one frame of the screen, with other application controls 606 and graphics rendering 607 being in separate frames within the screen. In other embodiments, the application control could also be placed in a floating or tool box window.

The flexibility of the 4D control components give users a simple, intuitive, and flexible means of exploring and analyzing 3D and 4D data. The wire frame design provides an easy to render user control solution and lends itself to being less obtrusive when used as an overlaid control. Limiting the user's ability to set perspective and orientation to the natural internal storage and access mechanisms of computers simplifies graphics rendering routines. This also provides flexible access to explore the data and a way to help the user maintain an understanding of the perspective and orientation. The alignment of the data with the control allows the Selector Box perspective, rotation, size and position to translate easily to the index bounds and order of traversal through an internal array for raster data. The design and flexibility of the user and application interfaces will support a wide range of configurations.

It should be noted that aspects of a graphical user control for 4D datasets as described herein can be accomplished by executing one or more sequences of one or more computer-readable instructions read into a memory of one or more computers from volatile or non-volatile computer-readable media capable of storing and/or transferring computer programs or computer-readable instructions for execution by one or more computers. Volatile computer readable media that can be used can include a compact disk, hard disk, floppy disk, tape, magneto-optical disk, PROM (EPROM, EEPROM, flash EPROM), DRAM, SRAM, SDRAM, or any other magnetic medium; punch card, paper tape, or any other physical medium. Non-volatile media can include a memory such as a dynamic memory in a computer.

In addition, although particular embodiments, aspects, and features have been described and illustrated, it should be noted that the invention described herein is not limited to only those embodiments, aspects, and features. It should be readily appreciated that modifications may be made by persons skilled in the art, and the present application contemplates any and all modifications within the spirit and scope of the underlying invention described and claimed herein. Such embodiments are also contemplated to be within the scope and spirit of the present disclosure.

What is claimed is:

1. A computer method for enabling navigation of an ocean dataset comprising:
    displaying, by an electronic computer, an extent of the ocean dataset in three dimensions in a wireframe cube;
    visually indicating, by the electronic computer, relative sizes of the dimensions based on data ranges of the dimensions;
    receiving, by the electronic computer, a plurality of first data selections from the ocean dataset, each of the plurality of data selections including an identification, a perspective, and an orientation of the first data selection, the identification based on a size and position of one of a plurality of selector boxes, the perspective and orientation based on a frame of reference provided by the wireframe cube;
    for each of the plurality of first data selections, receiving, by the electronic computer, a plurality of second data selections based on a fourth dimension of the ocean dataset, wherein the fourth dimension is a non-time related variable in the ocean dataset;
    modifying each of a plurality of navigation buttons to match a corresponding edge of a selected two-dimensional (2D) plane of a plurality of 2D planes that corresponds to the plurality of selector boxes, wherein one of the plurality of navigation buttons is highlighted to match an orientation of a highlighted edge of the selected 2D plane;
    receiving, by the electronic computer, a mouse location with respect to a location of the wireframe cube;
    toggling, by the electronic computer, a mode switch based on the mouse location, the mode switch enabling and disabling a control mode;
    displaying, by the electronic computer, a simplified rendering of the plurality of selector boxes if the control mode is disabled;
    displaying, by the electronic computer, a magnified view of information about the perspective if the control mode is enabled; and
    displaying, by the electronic computer, an orientation bar chosen to represent the perspective.

2. The method as in claim 1 further comprising:
    receiving a resizing of the one of the plurality of selector boxes, the resizing indicating a subset selection of a subset of the ocean dataset, the selector box located inside the wireframe cube, the selector box having a plurality of edges, each of the edges having at least two faces, the wireframe cube having a plurality of display edges;

retrieving data from the ocean dataset based on the subset selection;

receiving a viewing direction of the subset selection based on a selection of one of the faces of one of the edges;

analyzing the retrieved data; and displaying the analyzed data in a graphics box according to the received viewing direction.

3. The method as in claim 2 wherein the subset selection is a two-dimensional slice from the ocean dataset.

4. The method as in claim 2 wherein the subset selection is a three-dimensional slice from the ocean dataset.

5. The method as in claim 2 further comprising:
reviewing the analyzed data one step at a time by sliding one of the plurality of selector boxes along an axis of the wireframe cube.

6. The method as in claim 2 further comprising:
correlating one of the faces of one of the edges with one of the display edges of the wireframe cube;
marking the correlated one of the faces and one of the display edges with identical visual indicia; and
displaying the analyzed data oriented based on the correlated one of the faces and one of the display edges.

7. The method as in claim 2 further comprising:
displaying a preview of the perspective of the analyzed data on one of the plurality of selector boxes.

8. The method as in claim 2 further comprising:
associating a slider bar with a slider bar dimension in the ocean dataset, the slider bar having a slider bar position; and
retrieving the data associated with the slider bar dimension from the ocean dataset one value at a time based the slider bar position.

9. The method as in claim 8 further comprising:
creating a graphics rendering display area inside the graphics box, the graphics rendering display area displaying the analyzed data;
creating a controls area inside the graphics box, the control area displaying graphics control selections; and
creating a selection area within the graphics box, the selection area displaying the selector box and the slider bar, the selection area receiving the resizing of the selector box, the viewing direction, and the slider bar position.

10. The method as in claim 2 further comprising:
associating a slider bar with a slider bar dimension in the ocean dataset, the slider bar having at least two slider bar positions; and
retrieving a range of the data associated with the slider bar dimension from the ocean database based on the at least two slider bar positions.

11. The method as in claim 2 further comprising:
associating a slider bar with a slider bar dimension in the ocean dataset, the slider bar having at least two slider bar positions;
receiving a change of at least one of the at least two slider bar positions; and
retrieving a range of the data associated with the slider bar dimension from the ocean database based on the changed at least two slider bar positions.

12. The method as in claim 11 further comprising:
providing indicators to distinguish types of the data in the range.

13. A non-transitory computer readable medium comprising computer code for enabling navigation of an ocean dataset, the computer code, when executed by a processor, performing steps to:
display an extent of the ocean dataset in three dimensions in a wireframe cube, the wireframe cube visually indicating relative sizes of the dimensions based on data ranges of the dimensions;
display, in a plurality of selector boxes, a plurality of first data selections from the ocean dataset, each of the plurality of data selections including an identification, a perspective, and an orientation of the first data selection, the identification based on a size and position of one of the plurality of selector boxes, the perspective and orientation based on a frame of reference provided by the wireframe cube,
for each of the plurality of first data selections, the plurality of selector boxes displaying a plurality of second data selections based on a fourth dimension of the ocean dataset, wherein the fourth dimension is a non-time related variable in the ocean dataset,
the plurality of selector boxes displaying a modification for each of a plurality of navigation buttons that matches a corresponding edge of a selected two-dimensional (2D) plane of a plurality of 2D planes, wherein one of the plurality of navigation buttons is highlighted to match an orientation of a highlighted edge of the selected 2D plane, the plurality of selector boxes displaying a mouse location with respect to a location of the wireframe cube,
the plurality of selector boxes displaying a togglable mode switch based on the mouse location, the mode switch enabling and disabling a control mode;
display a simplified rendering of the plurality of selector boxes if the control mode is disabled;
display a magnified view of information about the perspective if the control mode is enabled; and
display an orientation bar representing the perspective.

14. The non-transitory computer readable medium as in claim 13 wherein the computer code is further to:
retrieve data from the ocean dataset based on the plurality of second data selections including:
receiving a selection of a face of an edge associated with a viewing direction of the data;
displaying the data in a graphics box according to the received viewing direction;
correlating one of the faces of one of the edges with a display edge of the graphics box;
marking the correlated one of the faces and one of the display edges with identical indicia; and
orienting the data based on the correlated one of the faces and one of the display edges.

15. The non-transitory computer readable medium as in claim 14 wherein the computer code is further:
review the data one step at a time by sliding one of the plurality of selector boxes along an axis of the graphics box.

16. The non-transitory computer readable medium as in claim 14 wherein the computer code is further to:
display a preview of the perspective of the data on one of the plurality of selector boxes.

17. The non-transitory computer readable medium as in claim 14 wherein the computer code is further to:
associate a slider bar with a slider bar dimension in the ocean dataset, the slider bar having a slider bar position; and retrieve the data associated with the slider bar dimension from the ocean dataset one value at a time based the slider bar position.

18. The non-transitory computer readable medium as in claim 14 wherein the computer code is further to:
associate a slider bar with a slider bar dimension in the ocean dataset, the slider bar having at least two slider bar positions; and
retrieve a range of the data associated with the slider bar dimension from the ocean database based on the at least two slider bar positions.

19. The non-transitory computer readable medium as in claim 18 wherein the computer code is further to:
provide indicators to distinguish types of the data in the range;
create a graphics rendering display area within the graphics box, the graphics rendering display area displaying the data;
create a control area within the graphics box, the control area displaying graphics control selections; and
create a selection area within the graphics box, the selection area displaying at least one of the plurality of selector boxes and the slider bar, the selection area receiving a resizing of the selector box, the viewing direction, and the slider bar position.

20. The non-transitory computer readable medium as in claim 13 wherein the plurality of second data selections are three-dimensional slices from the ocean dataset.

\* \* \* \* \*